(12) United States Patent
Jordan et al.

(10) Patent No.: US 7,178,005 B1
(45) Date of Patent: Feb. 13, 2007

(54) EFFICIENT IMPLEMENTATION OF TIMERS IN A MULTITHREADED PROCESSOR

(75) Inventors: Paul J. Jordan, Austin, TX (US); Ashley N. Saulsbury, Los Gatos, CA (US); John G. Johnson, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 400 days.

(21) Appl. No.: 10/881,225

(22) Filed: Jun. 30, 2004

(51) Int. Cl.
*G06F 12/00* (2006.01)

(52) U.S. Cl. ...................... 711/217; 711/219
(58) Field of Classification Search ............... 711/217, 711/219
See application file for complete search history.

(56) References Cited

U.S. PATENT DOCUMENTS

| | | | |
|---|---|---|---|
| 5,046,068 A | 9/1991 | Kubo et al. | |
| 5,257,215 A | 10/1993 | Poon | |
| 5,339,266 A | 8/1994 | Hinds et al. | |
| 5,386,375 A | 1/1995 | Smith | |
| 5,515,308 A | 5/1996 | Karp et al. | |
| 5,546,593 A | 8/1996 | Kimura et al. | |
| 5,619,439 A | 4/1997 | Yu et al. | |
| 5,954,789 A | 9/1999 | Yu et al. | |
| 6,076,157 A | 6/2000 | Borkenhagen et al. | |
| 6,088,788 A | 7/2000 | Borkenhagen et al. | |
| 6,088,800 A | 7/2000 | Jones et al. | |
| 6,105,127 A | 8/2000 | Kimura et al. | |
| 6,131,104 A | 10/2000 | Oberman | |
| 6,212,544 B1 | 4/2001 | Borkenhagen et al. | |
| 6,282,554 B1 | 8/2001 | Abdallah et al. | |
| 6,341,347 B1 | 1/2002 | Joy et al. | |
| 6,349,319 B1 | 2/2002 | Shankar et al. | |
| 6,357,016 B1 | 3/2002 | Rodgers et al. | |
| 6,397,239 B2 | 5/2002 | Oberman et al. | |
| 6,415,308 B1 | 7/2002 | Dhablania et al. | |
| 6,427,196 B1 | 7/2002 | Adiletta et al. | |
| 6,434,699 B1 | 8/2002 | Jones et al. | |
| 6,496,925 B1 | 12/2002 | Rodgers et al. | |
| 6,507,862 B1 | 1/2003 | Joy et al. | |
| 6,523,050 B1 | 2/2003 | Dhablania et al. | |

(Continued)

OTHER PUBLICATIONS

Tulsen et al., "Power-sensitive multithreaded architecture," IEEE 2000, pp. 199-206.

(Continued)

*Primary Examiner*—Reba I. Elmore
(74) *Attorney, Agent, or Firm*—Meyertons Hood Kivlin Kowert & Goetzel, P.C.; Rory D. Rankin

(57) ABSTRACT

A method and mechanism for managing timers in a multithreaded processing system. A storage device stores a plurality of count values corresponding to a plurality of timers. A read address generator is coupled to convey a read address to the storage device. The read address generator is configured to maintain and increment a first counter. In response to determining the counter does not equal a predetermined value, the mechanism conveys a first read address for use in accessing a count value in the storage device. In response to determining the count equals the predetermined value, the mechanism conveys a second read address for use in accessing a count value in the storage device. The predetermined value is utilized to repeat accesses to a given count value a predetermined number of times.

23 Claims, 7 Drawing Sheets

U.S. PATENT DOCUMENTS

| | | |
|---|---|---|
| 6,564,328 B1 | 5/2003 | Grochowski et al. |
| 6,567,839 B1 | 5/2003 | Borkenhagen et al. |
| 6,594,681 B1 | 7/2003 | Prabhu |
| 6,625,654 B1 | 9/2003 | Wolrich et al. |
| 6,629,236 B1 | 9/2003 | Aipperspach et al. |
| 6,629,237 B2 | 9/2003 | Wolrich et al. |
| 6,668,308 B2 | 12/2003 | Barroso et al. |
| 6,668,317 B1 | 12/2003 | Bernstein et al. |
| 6,671,827 B2 | 12/2003 | Guilford et al. |
| 6,681,345 B1 | 1/2004 | Storino et al. |
| 6,687,838 B2 | 2/2004 | Orenstien et al. |
| 6,694,347 B2 | 2/2004 | Joy et al. |
| 6,694,425 B1 | 2/2004 | Eickemeyer |
| 6,697,935 B1 | 2/2004 | Borkenhagen et al. |
| 6,708,197 B1 | 3/2004 | Ryu et al. |
| 6,728,845 B2 | 4/2004 | Adiletta et al. |
| 6,748,556 B1 | 6/2004 | Storino et al. |
| 6,801,997 B2 | 10/2004 | Joy et al. |
| 6,820,107 B1 | 11/2004 | Kawai et al. |
| 6,847,985 B1 | 1/2005 | Gupta et al. |
| 6,857,064 B2 | 2/2005 | Smith et al. |
| 6,883,107 B2 | 4/2005 | Rodgers et al. |
| 6,889,319 B1 | 5/2005 | Rodgers et al. |
| 6,898,694 B2 | 5/2005 | Kottapalli et al. |
| 2004/0172631 A1* | 9/2004 | Howard ...................... 718/100 |

OTHER PUBLICATIONS

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA 1995, pp. 533-544.

Tullsen, et al., "Exploiting Choice: Instruction Fetch and Issue on an Implementable Simultaneous Multithreading Processor," pp. 191-202.

Smith, "The End of Architecture," May 29, 1990, pp. 10-17.

Alverson et al., "Tera Hardware-Software Cooperation," 16 pages.

Ungerer et al., "A Survey of Processors with Explicit Multithreading," ACM Computing Surveys, vol. 35, No. 1, Mar. 2003, pp. 29-63.

Alverson et al., "The Tera Computer System," ACM 1990, 6 pages.

Alverson et al., "Exploiting Heterogeneous Parallelism on a Multithreaded Multiprocessor," ACM 1992, pp. 188-197.

Uhrig, et al., "Implementing Real-Time Scheduling Within A Multithreaded Java Microcontroller," 8 pages.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High-Performance Processors," ACM 2001, pp. 16-21.

Gura, et al., "An End-to-End Systems Approach to Elliptic Curve Cryptography," 16 pages.

Eberle, et al., "Cryptographic Processor for Arbitrary Elliptic Curves over $GF(2^m)$," 11 pages.

* cited by examiner

EFFICIENT IMPLEMENTATION OF TIMERS IN A MULTITHREADED PROCESSOR

BACKGROUND OF THE INVENTION

1. Field of the Invention

The invention relates to computing systems and, more particularly, to an efficient implementation of timers in a multithreaded processing system.

2. Description of the Related Art

Microprocessors and other processing devices frequently include mechanisms for controlling the scheduling of processes and access to resources in general. Because multiple processes may be executing within a given device, or may otherwise be seeking access to a limited number of resources, it is often desirable or necessary to implement some type of timesharing mechanism in order to allow the processes shared access according to some particular schedule. Due to the nature of timesharing and other scheduling mechanisms, timers are frequently utilized to provide software a simple mechanism for controlling the scheduling processes. For example, in a simple uniprocessor system, prior to scheduling the execution of a particular process by the processor, a supervisor (e.g., an operating system component) or other control program may set a timer which controls how long the process may run before control is returned from the processor to the operating system. By maintaining control over how long processes may run, the operating system or other control program can time multiplex use of the processor between multiple processes in a controlled manner.

Some software models provide for multiple levels of supervisors. For example, some software models may utilize an intermediate layer between the hardware and one ore more supervisors. In this manner the hardware layer is abstracted from the supervisor or operating system. In some models this intermediate layer may be referred to as the hypervisor. The supervisor then runs under the control of the hypervisor and user programs run under the control of the supervisor. In such a model, not only may a particular supervisor time multiplex processes on a given processor, but multiple supervisors may also be time multiplexed. Consequently, multiple levels of time multiplexing may exist within a given system.

In order to support multiple levels of time multiplexing, a processor may include multiple timers. One timer may provide the ability of a hypervisor to regain control from a supervisor. Another timer may provide the ability of the supervisor to regain control from a user program. Still other timers may be used by user programs or for other reasons. Typically, each of these timers are implemented by comparing a value in a dedicated register to a reference clock or counter of some sort. The typical reference counter may simply be a register whose value is incremented every processor cycle. A typical implementation of each additional timer may be a second register (the "compare" register) that feeds a comparator. The comparator compares the contents of the compare register with the current state of the reference counter.

One problem with the above described approach is that the number of compare registers increases with the number of software layers. For example, in the hypervisor—supervisor—user model, each level normally has its own compare register even though they may all share the same reference counter. In addition, each compare register typically has its own comparator. Further, if a processor is configured to execute more than a single thread, each of these timers must generally be implemented for each thread and the total number of timers may rapidly grow to a relatively large number.

Accordingly, an efficient mechanism for implementing timers is a computing system is desired.

SUMMARY OF THE INVENTION

A method and mechanism are contemplated for managing timers in a multithreaded processing system. In one embodiment, a processing system is configured as multiple layers of control programs. In addition, the system includes multiple cores, each of which has the ability to execute multiple threads of instructions. Each core includes a random access memory whose location store timer/count values which correspond to timers for the threads and layers of control programs. Accesses to resources in the system are time multiplexed between control programs and threads, and the stored count values are utilized in the management of this time multiplexing.

In a given core, a read address generator is coupled to convey a read address to the local storage device. In response to receiving an access to a stored timer value, the random access memory conveys the accessed value which is then compared to a reference count. If the conveyed count equals the reference count, an indication is conveyed which indicates expiration of the timer. Software generated read accesses to stored timer values may occur at any time and take precedence over accesses whose purpose is to check for timer expirations.

The read address generator is configured to maintain and increment a first counter. In response to determining the counter does not equal a predetermined value, the a first read address is conveyed for use in accessing a count value in the random access memory. If the count equals the predetermined value, the a second read address is conveyed for use in accessing a count value in the storage device. Each cycle the first counter is incremented and compared to the predetermine value. The predetermined value is utilized to ensure repeated accesses to a given count value location and ensure a read of the addressed location in spite of intervening higher priority software initiated accesses. Also contemplated is an embodiment wherein only a single comparator is utilized to compare a reference value to count values conveyed from the random access memory.

Other features of the embodiments described herein will become apparent upon reading the following detailed description and upon reference to the accompanying drawings.

DETAILED DESCRIPTION

Overview of Multithreaded Processor Architecture

Figure 1:
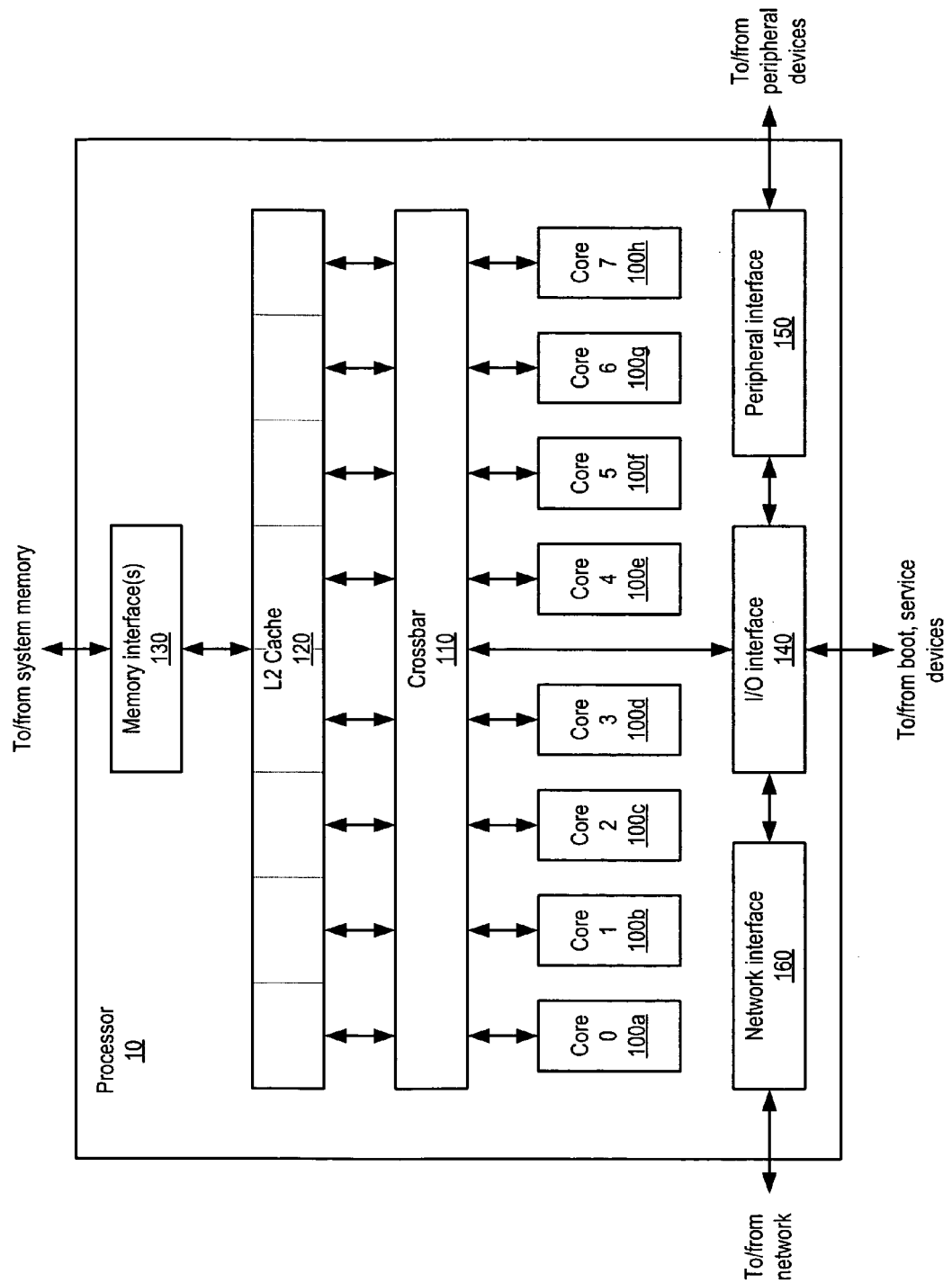
FIG. 1 is a block diagram illustrating one embodiment of a multi-threaded, multi-core microprocessor.

A block diagram illustrating one embodiment of a multithreaded processor 10 is shown in FIG. 1. In the illustrated embodiment, processor 10 includes a plurality of processor cores 100a–h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150, and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC V9 ISA, although in other embodiments it is contemplated that any desired ISA may be employed, such as x86, PowerPC or MIPS, for example. (SPARC is a registered trademark of Sun Microsystems, Inc.; PowerPC is a registered trademark of International Business Machines Corporation; MIPS is a registered trademark of MIPS Computer Systems, Inc.). In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any of the cores 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express), although it is contemplated that any suitable interface standard or combination of standards may be employed. For example, in some embodiments peripheral interface 150 may be configured to implement a version of Universal Serial Bus (USB) protocol or IEEE 1394 (Firewire) protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-Grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
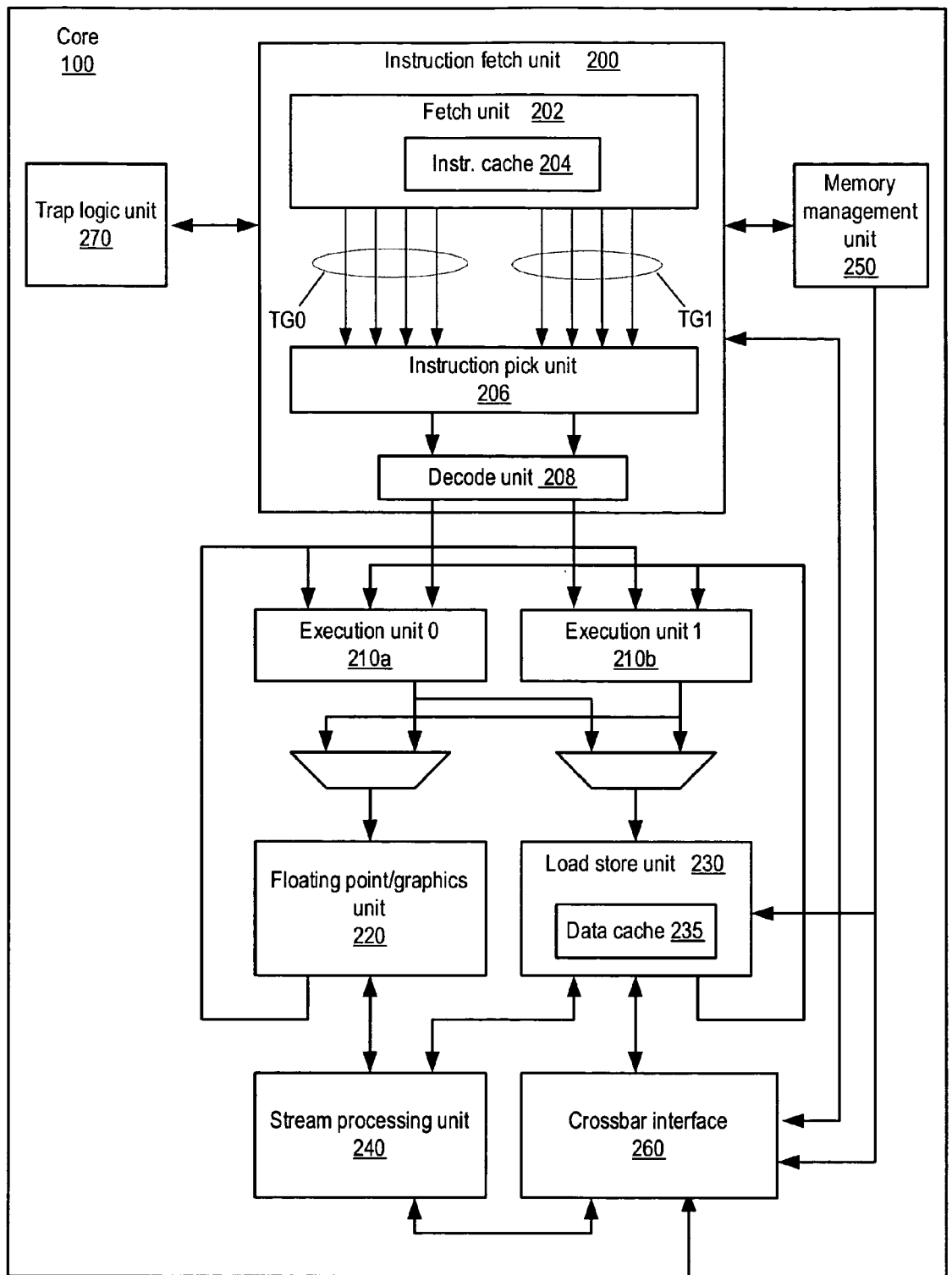
FIG. 2 depicts one embodiment of a core as illustrated in FIG. 1.

FIG. 2 illustrates one embodiment of core 100 which is configured to perform fine-grained multithreading. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a–b. (Execution units 210a–b may also be referred to generically as EXUs 210.) Each of execution units 210a–b is coupled to both a floating point/graphics unit (FGU) 220 and a load store unit (LSU) 230. Each of the latter units is also coupled to send data back to each of execution units 210a–b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement an instruction buffer for each thread wherein several recently fetched instructions corresponding to a given thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1. For example, if core 100 implements eight threads, then each of thread groups TG0 and TG1 may include four threads. Alternative numbers of threads and groupings are possible and are contemplated.

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210*a–b* may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210*a* may be configured to execute integer instructions issued from TG0, while EXU1 210*b* may be configured to execute integer instructions issued from TG1. Further, each of EXUs 210 may include an integer register file configured to store register state information for all threads in its respective thread group. For example, if core 100 implements eight threads 0–7 where threads 0–3 are bound to TG0 and threads 4–7 are bound to TG1, EXU0 210*a* may store integer register state for each of threads 0–3 while EXU1 210*b* may store integer register state for each of threads 4–7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement Single Instruction Multiple Data (SIMD) graphics-oriented instructions defined by a version of the SPARC Visual Instruction Set (VIS) architecture, such as VIS 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands from FGU 220 or LSU 230, to freely schedule operations across its various algorithmic subunits and to signal FGU 220 or LSU 230 when a given result is ready to be written back or stored. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate processing of the result (for example, by using dedicated control registers to convey results).

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 208 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode or hypervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

Figure 3:
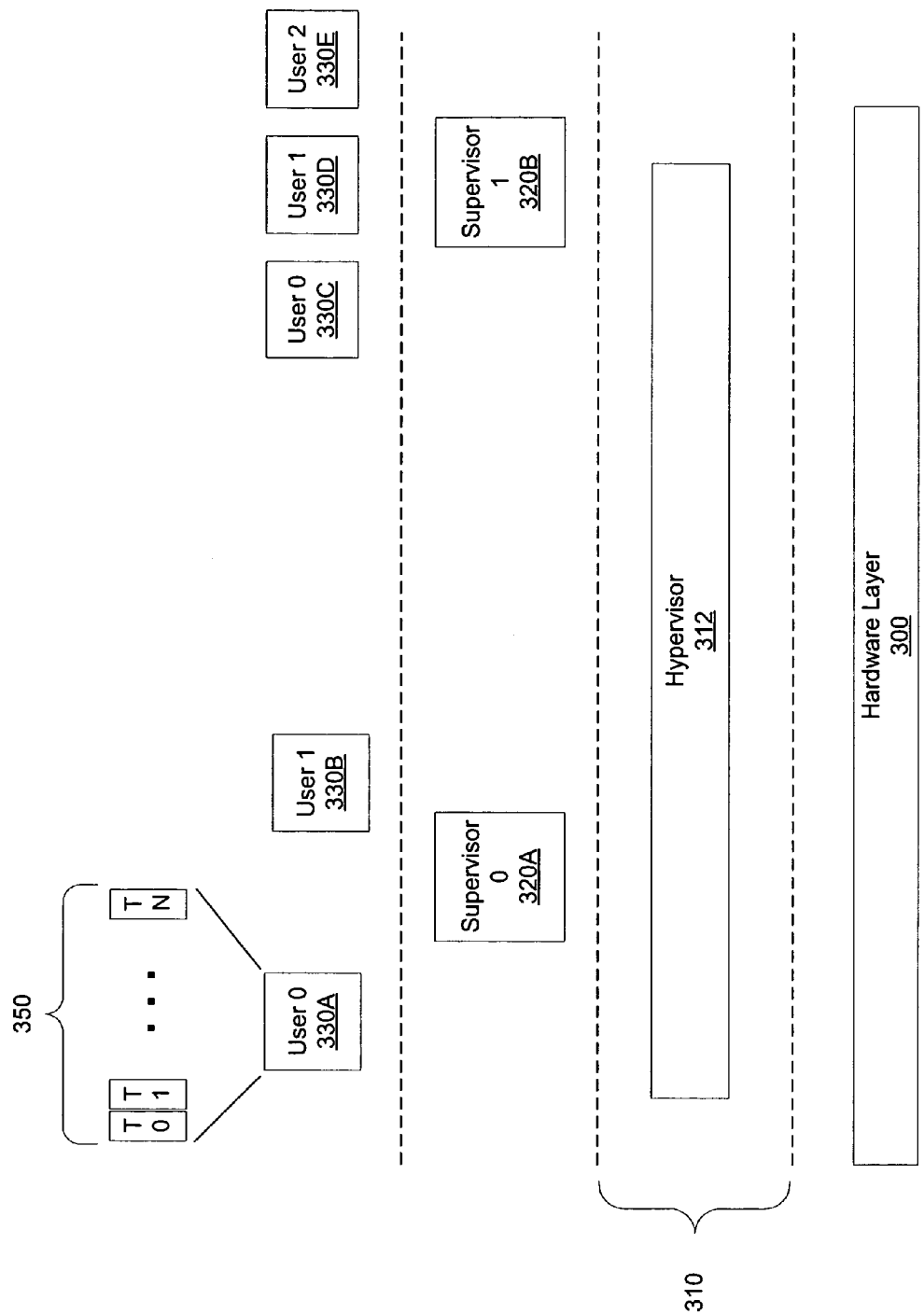
FIG. 3 illustrates one embodiment of a multi-layered processing system.

As noted above, some software models provide for multiple "levels" of supervisors wherein certain supervisors themselves may timeshare access to particular resources. FIG. 3 depicts one embodiment of a system which includes multiple levels of supervisors or control programs. As is ordinarily the case in processing systems, there exists a hardware layer 300 with which supervisors (e.g., operating systems and related software) interface. Also shown in FIG. 3 are two supervisors 320A–320B. However, rather than interfacing directly with the hardware layer 300, an intermediate layer 310 including a hypervisor 312 has been interposed between the supervisors 320 and the hardware layer 300. In this manner the hardware layer is abstracted from the supervisors 320 and the supervisors interface with the hypervisor 312 rather than the hardware layer 300. In this model the supervisors 320 run under the control of the hypervisor 312.

Each supervisor 320 depicted in FIG. 3 is configured to control operation of one or more user programs or processes. For example, supervisor 0 320A is configured to control user programs 330A and 330B, and supervisor 1 320B is configured to control user programs 330C, 330D, and 330E. As may be appreciated, during operation the number of user programs being controlled by a particular supervisor may change.

In the embodiment depicted by FIG. 3, each supervisor 320 is generally configured to time multiplex access by each user program 330 to the hardware and other resources of the system. For example, supervisor 0 320A may allocate N clock cycles to each of user programs 330A and 330B on an alternating basis. In addition, hypervisor 312 is configured to time multiplex access by each supervisor 320A and 320B to system resources. Consequently, multiple levels of time multiplexing may exist within the illustrated system.

Generally speaking, timers are utilized to control the time multiplexing of processes. For example, the hypervisor 312 may include timer logic corresponding to each of the supervisors 320A and 320B. Similarly, each of the supervisors 320A–320B may include timer logic corresponding to each user program 330 which it is controlling. Given such a model, the multiplication of timers becomes readily apparent as the number of layers increases. Still further, in one embodiment, there may be more than a single task 350 (denoted T0–TN) associated with a given user program. In a system configured to support multiple threads as described above in FIGS. 1–3, it may be necessary to maintain for each thread some kind of timer associated indication (e.g., a count of cycles) related to this time-multiplexing mechanism.

Figure 4:
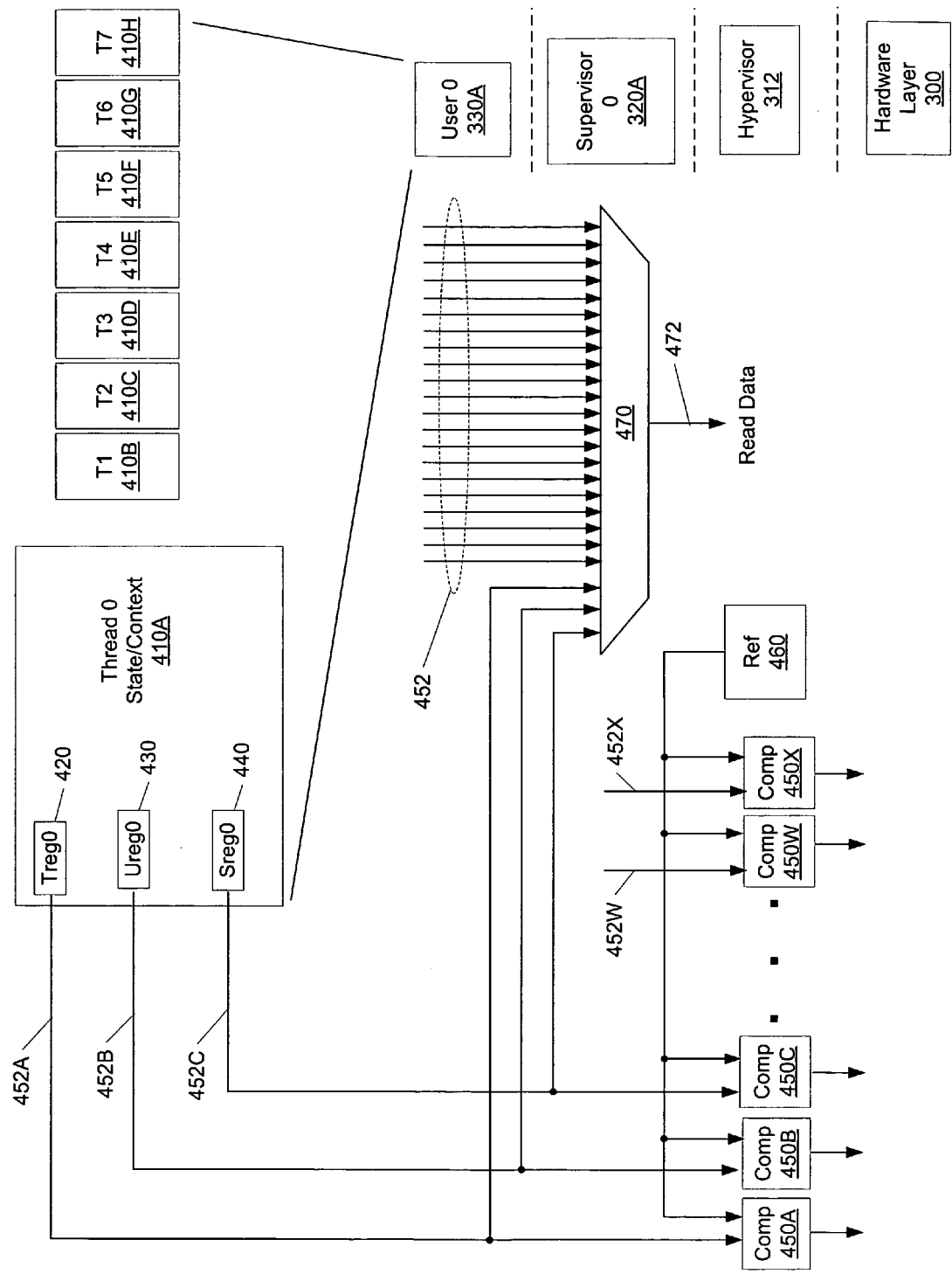
FIG. 4 illustrates one embodiment of a mechanism to manage multiple timers in a multithreaded system.

FIG. 4 illustrates one embodiment of a multithreaded system within a core 100 configured to maintain multiple levels of timers. This system supports a hardware layer 300, hypervisor 312, supervisor 0 320A, and user program 0 330A as in FIG. 3 and is configured to maintain up to eight threads as described above. Associated with each of the eight threads is a state or context 410A–410H as shown in FIG. 4. As described, each thread has associated with it timer logic for each level within the system. Each of the threads then maintain timers which correspond to the thread and are under control of an associated user program, supervisor, and hypervisor, respectively. For example, state for thread 0 410A is shown to include a register corresponding to each of these levels. A first register, Treg0 420, is under control of an associated user program. Treg0 420 may be configured to maintain a count of cycles for a task under control of the user program. A second register, Ureg0 430, is under control of an associated supervisor. Ureg0 430 may be configured to maintain a count of cycles for a user program under control of the supervisor. Finally, a third register, Sreg0 440, is under control of an associated hypervisor. Sreg0 440 may be configured to maintain a count of cycles for a supervisor under control of the hypervisor.

In one embodiment, a reference count 460 is maintained for the system which is generally incremented each clock cycle. When time is allocated to a particular entity (e.g., a supervisor, user program, or task), a count may be stored in a register which corresponds to the entity. The count stored in the entity register may equal the time allocated for the particular entity (e.g., N cycles) added to the current count (e.g., M) indicated by the reference count 460. Periodically the count in the entity register is compared to the reference count. If the entity register count equals the reference count, a signal indicating timer expiration is conveyed. In one embodiment, the timer expiration signal is conveyed to trap logic unit 270 (shown in FIG. 2) which manages traps, exceptions, and interrupts. The trap logic unit 270 may then return control of the hardware thread to the supervisor or hypervisor, or it may return control to the supervisor or hypervisor at some later time.

In the embodiment of FIG. 4, each of the registers are coupled to comparator logic for comparison to a reference count 460. For example, Treg0 420 is coupled to comparator 450A via bus 452A; Ureg0 430 is coupled to comparator 450B via bus 452B; and Sreg0 440 is coupled to comparator 450C via bus 452C. In addition, three similar registers for each of the remaining seven threads 410B–410H are likewise coupled to comparator logic where they are compared to reference count 460. Consequently, 24 registers are included. For example, comparators 450W and 450X are shown to receive reference count 460 and input from a register via bus 452W and bus 452X, respectively. For ease of illustration, not all buses, registers, and comparators are shown. As each thread state includes three registers, and there are eight threads, 24 comparators 450 are utilized. In addition, 24 buses 452 are utilized to convey register values to the comparators. Output from each of the comparators 450 may be coupled directly to trap unit logic. Those skilled in the art will appreciate that each of the 24 count registers and comparators 450 may be distributed throughout a given implementation in a wide variety of ways.

Also shown in FIG. 4 is a multiplexor 470 coupled to each of buses 452A–452X. Generally speaking, multiplexor 470 is coupled to receive input from each of the 24 count registers via a bus. Each of the remaining 21 buses are generally depicted by reference 452. Each of the count registers may be both read from, or written to, by software. Multiplexor 470 is configured to convey read data corresponding to one of the count registers. Not shown in FIG. 4 are the structures to support writes to each of the registers. In one embodiment, each count register (e.g., 420, 430, 440) may include 64 bits of data. Likewise, each of buses 452 may include 64 bits. In one embodiment, for each cycle of execution the reference count 460 is incremented, comparators 450 compare data received on their inputs and convey a compare signal.

Figure 5:
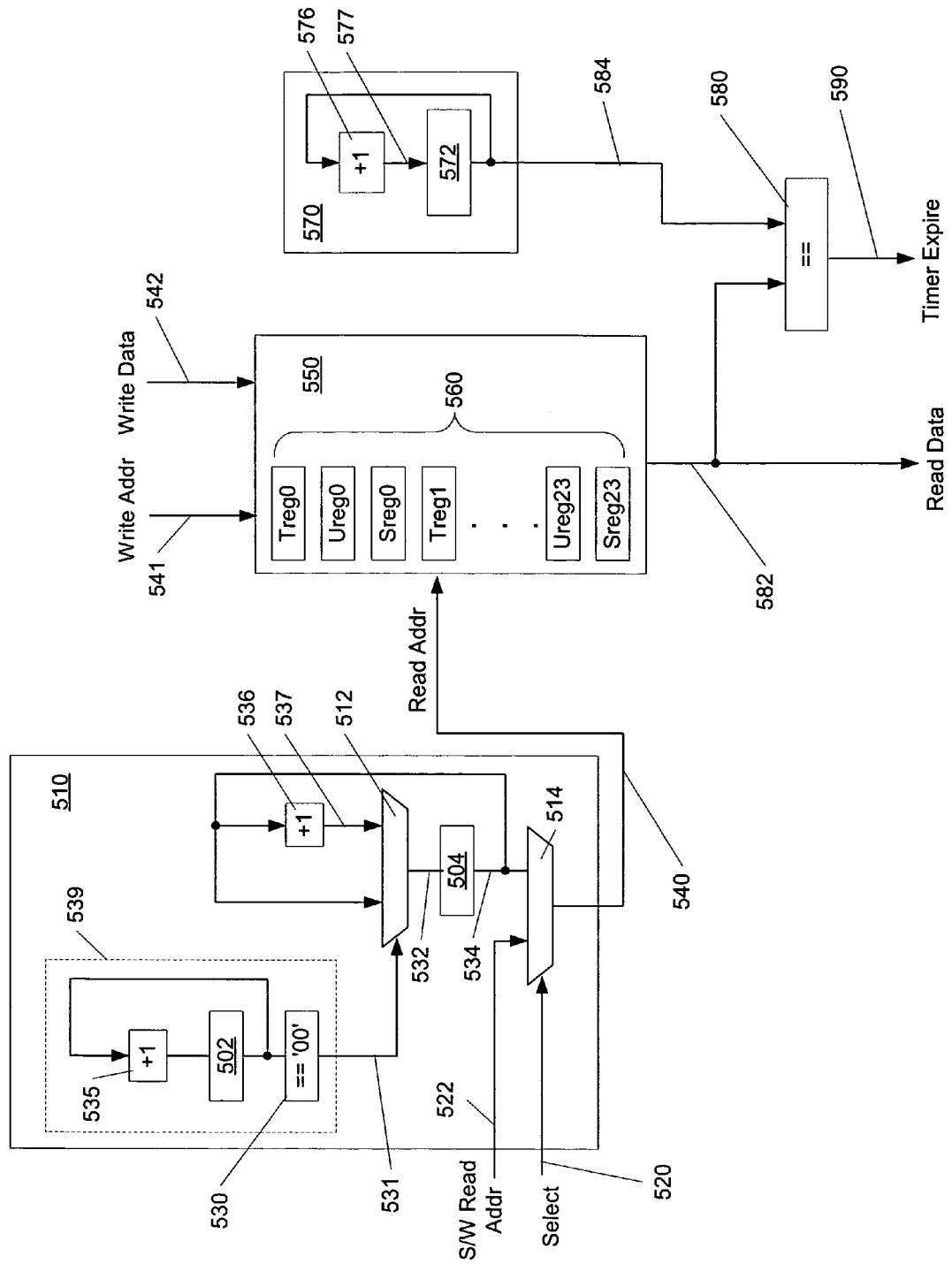
FIG. 5 illustrates one embodiment of a mechanism to manage multiple timers in a multithreaded system.

Turning now to FIG. 5, an alternative embodiment of a multiple timer mechanism is depicted. In the embodiment of FIG. 4, a multiplexor, buses, and a number of comparators were utilized to implement the multiple timer mechanism. In FIG. 5, an alternative implementation is utilized which generally entails a significant reduction in the amount of logic required vis-à-vis FIG. 4. In the embodiment of FIG. 5, read address logic 510, a memory device 550, a reference count mechanism 570, and a comparator 580 are shown. Generally speaking, memory device 550 is configured to store data corresponding to the 24 count registers 560 as described with reference to FIG. 4. For example, three count registers (Treg0, Ureg0, Sreg0) corresponding to a first thread are depicted as the first three registers. Numerous alternative ways of ordering the 24 registers within the memory device are possible and are contemplated.

Generally speaking, read address logic 510 is configured to convey a read address 540 to memory device 550. Memory device conveys read data 582 responsive to a read access. The conveyed read data 582 is conveyed to a comparator 580, which also receives input 584 from a reference count mechanism 570. Reference count mechanism 570 includes a latch 572 to store a current count and an incrementer 576 to increment the current count periodically (e.g., every cycle). Comparator 580 conveys a compare signal 590 which may indicate whether or not a particular timer has expired.

In contrast to the embodiment of FIG. 4, FIG. 5 is configured to utilize a memory storage device 550 for storage of the count registers 560. In one embodiment, memory storage device comprises a random access memory device, such as an SRAM, coupled to receive data via bus 542 and convey data via bus 582. Because SRAM 550 already includes the logic necessary to perform reads and writes to the storage locations therein, the multiple buses (452) and large multiplexor (470) described in FIG. 4 are not required. Still further, as count register values are conveyed via read data bus 582, only a single comparator 580 is required. Accordingly, the amount of logic required to support the multiple timers is reduced.

In the embodiment of FIG. 5, read address logic 510 is configured to generate the read addresses 540 for use in accessing the SRAM 550. Read address logic 510 includes a first portion 539 which is configured to convey a select signal 531 to a multiplexor 512. Multiplexor 512 is configured to convey output 532 to latch 504. The current value within latch 504 is conveyed to multiplexor 514. Multiplexor 514 also receives as input a read address 522 which is generated by software. Select signal 520 is configured to select as a read address 540 either (i) the received software generated read address 522, or (ii) the value currently stored within latch 504. In one embodiment, read accesses initiated by software take precedence over read accesses to check for timer expiration and the select signal 520 is asserted responsive to the software read access.

In one embodiment, software may generate read accesses to the count values stored within memory device 550 at any time and memory device 550 may be multiported so that software read and/or write accesses may be performed concurrent with attempts to check for expired timer conditions. In the embodiment shown, a single read address signal 540 is utilized for both software read accesses and read accesses performed to check for timer expiration. As software read accesses may generally occur at any time and may take precedence over read access to check for timer expiration, conflicts may arise between such software accesses and those accesses to check for timer expiration. Without taking intervening software accesses into consideration, blind incrementation of the read address for accesses to detect timer expirations may skip one or more count values stored within the memory 550 and miss an expiration.

In addition to the above, in an embodiment where SRAM 550 is dual ported (i.e., separate address and data buses are coupled to SRAM 550 for read and write accesses, respectively), the potential for indeterminate data conveyed via read data bus 582 arises. If both a read and a write access to SRAM 550 occur simultaneously, various possibilities exist for the data subsequently conveyed via read data bus 582. If the simultaneously received read access is performed before the write access, then the "old" register data will be conveyed. Alternatively, if the write access is performed prior to the read access, then the "new" register data will be conveyed. Finally, if the read and write accesses are not strictly ordered and both accesses attempt to access the same location at the same time, the data conveyed via bus 582 is indeterminate. Because software accesses may generally occur at any time, and the timer mechanism has a need to access the timer counts stored within SRAM 550 on a regular basis, an approach which guarantees access by the timer mechanism to the stored timer counts is necessary. In order to account for these potential conflicts, an approach as described below may be utilized.

Depending upon the particular system within which the timer mechanism is employed, the frequency with which software accesses may occur may be known or otherwise determined. Based upon this knowledge, an approach may be developed which deals with the above described conflicts. For example, in one embodiment, it may be known that software read or write accesses to SRAM 550 may occur no more frequently than every other cycle. In addition, write accesses to SRAM 550 may be skewed by one cycle with respect to read accesses. For example, if software read accesses are initiated on even numbered cycles, then software write accesses are initiated on odd numbered cycles, or vice-versa. Given such a system, Table 1 below illustrates the different combinations of software accesses which may occur during a 3 cycle period.

TABLE 1

| | Software Accesses | | |
|---|---|---|---|
| | Cycle 0 | Cycle 1 | Cycle 2 |
| Scenario 1 | R | | R |
| Scenario 2 | | R | |
| Scenario 3 | W | | W |
| Scenario 4 | | W | |
| Scenario 5 | R | | |
| Scenario 6 | W | | |
| Scenario 7 | R | W | |
| Scenario 8 | | R | W |
| Scenario 9 | | | R |
| Scenario 10 | W | R | |
| Scenario 11 | | W | R |
| Scenario 12 | | | W |

From the scenarios in Table 1 above, it may be seen that in the worst case two out of three cycles are occupied by a software accesses. Consequently, to avoid a conflict with software accesses in the above illustrated embodiment, the timer mechanism can be guaranteed a conflict free read access by performing at least three consecutive reads to a particular SRAM 550 location. In general, if software is capable of up to N−1 read accesses during N cycles, the timer mechanism must perform N accesses to a particular location during that period of N cycles to guarantee success.

In the embodiment of FIG. 5, read addresses generated for the purposes of checking timer counts stored in memory 550 are conveyed as signal 532 and latched via latch 504. As can be seen from FIG. 5, signal 532 comprises one of two signals received as input to multiplexor 512. A first value 534 received by multiplexor 512 simply represents the current state of latch 504. A second value 537 represents the value conveyed by incrementer 536. Generally speaking, incrementer 536 is configured to increment the value represented by the current state of latch 504 by one. Those skilled in the art will appreciate that the read address logic 510 may be configured to increment addresses in increments other than one.

In one embodiment, logic 539 is configured to assert signal 531 every N cycles. For example, latch 502 may be configured to store a two bit count which is incremented each cycle by incrementer 535. In such an embodiment, N equals four. Comparator 530 may then compare the two bit count to the bits "00" and if equal assert signal 531. When signal 531 is asserted, multiplexor 512 is configured to convey as output 532 the signal 537. In this manner, the address latched by latch 504 is incremented every N cycles. Stated otherwise, the address latched by latch 504 remains unchanged for N cycles. Consequently, the mechanism may attempt a read to the same address (for the purpose of checking for an expired timer) during N consecutive cycles.

In view of the discussion above, and the example of Table 1, up to three software accesses during any 4 cycle period may be performed and the timer mechanism will still be guaranteed a conflict free access. In one embodiment, up to two software accesses may be possible during a 3 cycle period. However, rather than the timer mechanism attempting 3 consecutive reads to a particular location to guarantee a conflict free access, for ease of implementation the timer mechanism may be configured to perform 4 consecutive reads to a particular location. In alternative embodiments, comparator 530 may be programmable such that any particular period of time may be detected. In addition, various embodiments may include providing a signal (e.g., a valid indication) to comparator 580 to indicate that a value received via bus 582 corresponds to a conflict free timer mechanism read access. Timer mechanism read accesses which are not concurrent with a software write access may generally be deemed conflict free. In addition, a timer mechanism read access to a location which is concurrent with a software write access to a different location may also be deemed conflict free. Data conveyed via bus 582 as a result of a software read access would not be deemed valid for purposes of timer expiration checking.

In the embodiment described above, eight threads are supported and three count registers are supported for each. Consequently a total of 24 registers are included in the memory device 550. In one embodiment, read address 540 may include five bits. If read addresses are in increments of one, the five bits of the address 540 is capable of addressing more than 24 locations. In on embodiment, additional logic may be included which causes the read address 540 to wrap from 23 to 0. Alternatively, additional logic may be included which ignores invalid addresses. Numerous such alternatives are possible and are contemplated.

In addition to the above, the comparison between the reference count 584 and a particular timer count stored within SRAM 550 must account for the latency between accesses to each of the registers 560 stored in the SRAM 550. In general, reference count mechanism 570 may be configured to increment the value stored therein every cycle. However, timer logic 510 may be configured to access each of registers 560 only once every M cycles. In the discussion above, a read of a particular timer count stored within the SRAM 550 is attempted during 4 consecutive cycles. In addition, 24 count values stored within the SRAM 550 may be accessed in a round-robin fashion. Consequently, reference count 584 will have been incremented numerous times between compares to a given timer count value 560. In order to account for the number of cycles which occur between accesses to a given timer count 560, a selected number of bits of the reference count 584 may be masked off or otherwise ignored for purposes of comparison to a timer count 560. For example, if it is known that there are 128 cycles between accesses to a particular count value 560, then the least significant seven bits of the reference count 584 may be ignored during the comparison indicated by comparator 580. Those skilled in the art will appreciate that there are numerous ways of masking bits values, or otherwise ignoring bits values, for the comparison described above.

Figure 6:
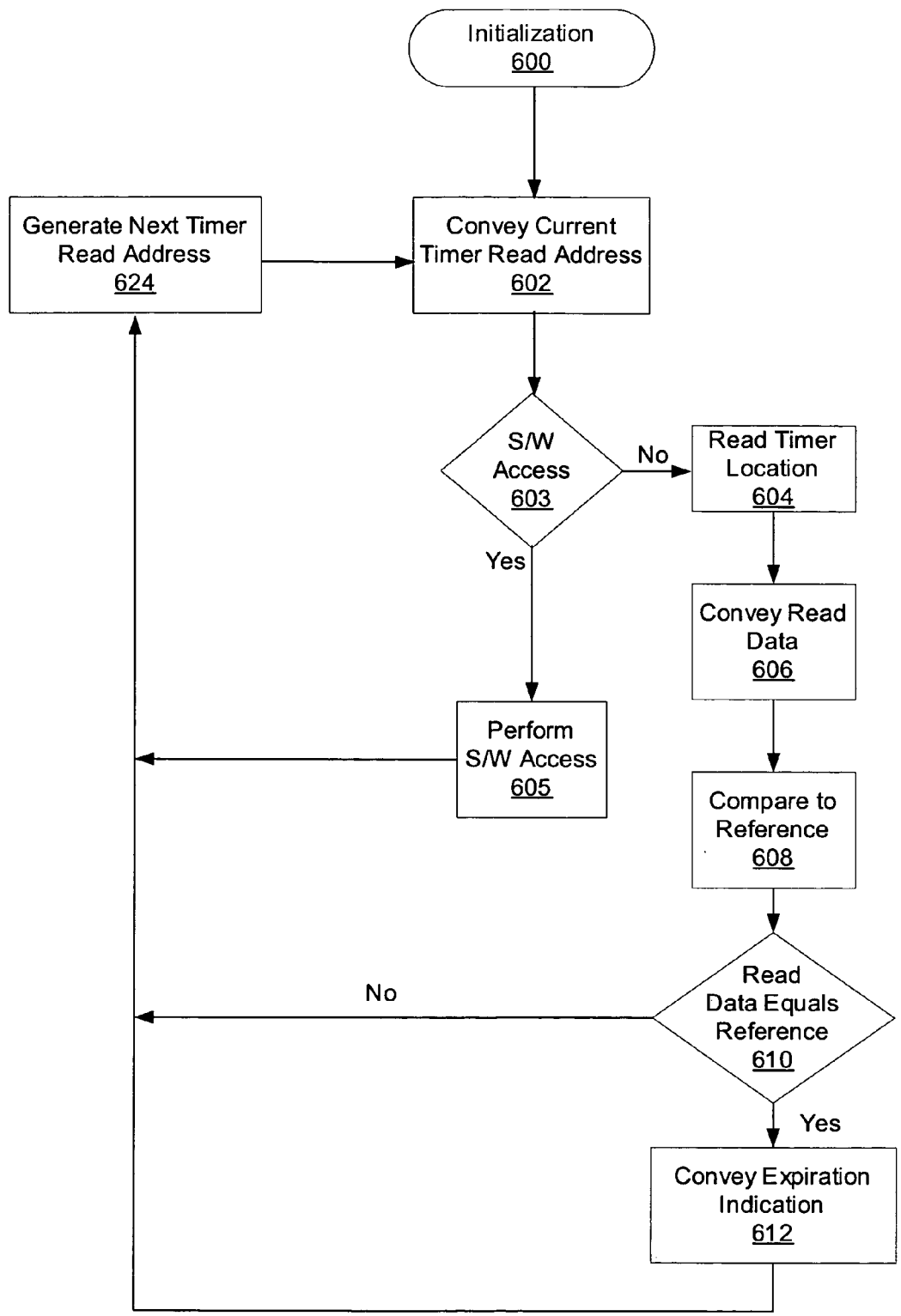
FIG. 6 depicts one embodiment of a process for managing multiple timers in a multithreaded system.

FIG. 6 illustrates one embodiment of a method for managing timers in a system. Subsequent to performing any desired initialization procedures (block 600) such as clearing registers, counts, etc., a current timer read address is conveyed (block 602). For example, with reference to FIG. 5 the timer read address which is conveyed may generally correspond to signal 540. In response to determining whether a software read access is being performed (decision block 603), either a software read access is performed (block 605) or a read of a timer count location is performed (block 604). If no software access is being performed (decision block 603), a timer count location is read (block 604), the timer count is conveyed (block 606) and compared to a reference count (block 608) as described above. If the timer count equals the reference count (decision block 610), a corresponding timer expiration indication is conveyed (block 612). If the timer count does not equal the reference count (decision block 610), the timer expiration indication is not conveyed. In contrast, if a software access is being performed (decision block 603), then the software access (read or write) is performed (block 605).

Subsequent to performing a software access or a timer count read, the next timer read address is generated (block 624). As described above, a given timer read address may be repeated during N consecutive cycles. Consequently, the next timer read address generated in block 624 may be the same as the current timer read address. It is also noted that various actions depicted in FIG. 6 may occur in an order different than that depicted. In addition, certain activities may occur concurrently with other activities. For example, the generation of the next timer read address as indicated by block 624 may in fact be performed concurrent with other activities depicted in FIG. 6. Numerous such alternatives are possible and are contemplated.

Exemplary System Embodiment

Figure 7:
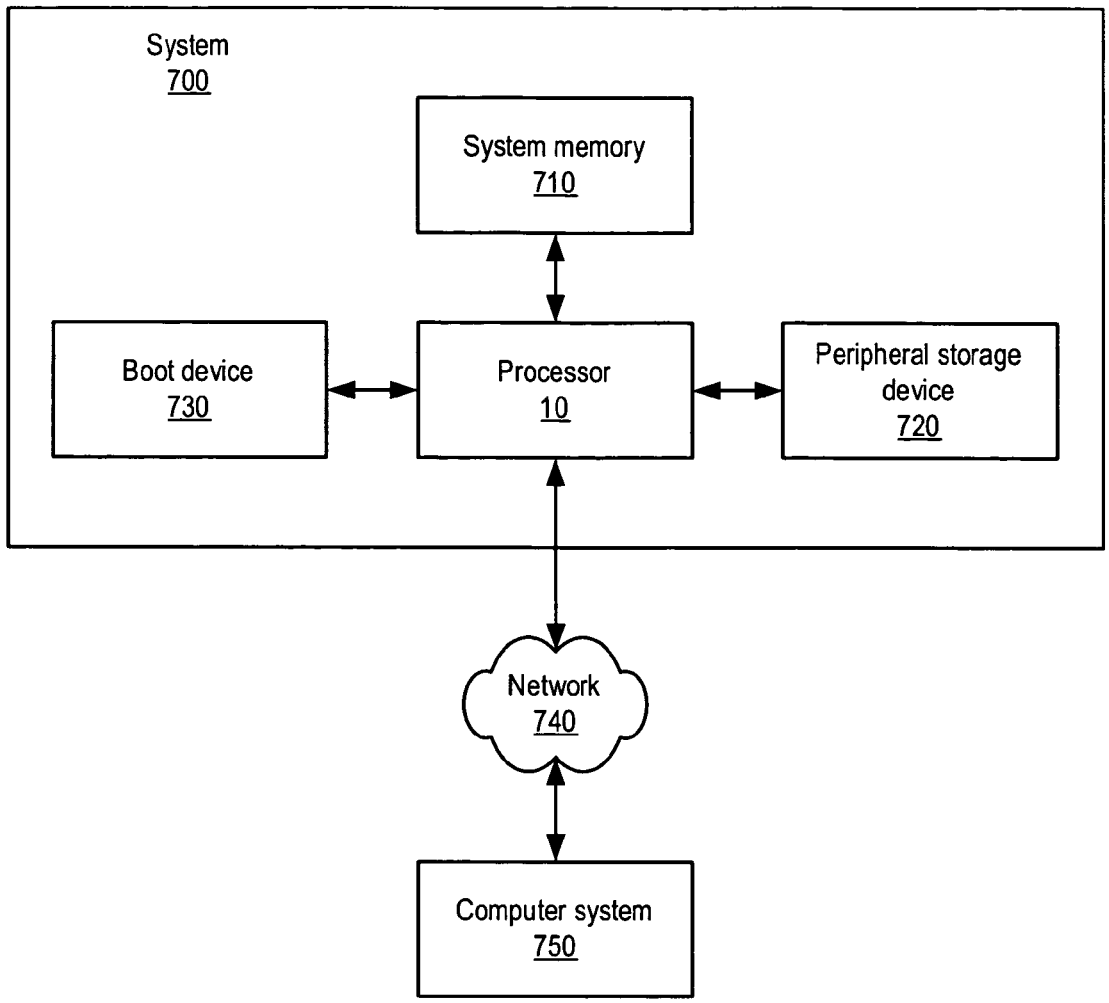
FIG. 7 depicts one embodiment of a computing system.

As described above, in some embodiments processor 10 of FIG. 1 may be configured to interface with a number of external devices. One embodiment of a system including processor 10 is illustrated in FIG. 7. In the illustrated embodiment, system 700 includes an instance of processor 10 coupled to a system memory 710, a peripheral storage device 720 and a boot device 730. System 700 is coupled to a network 740, which is in turn coupled to another computer system 750. In some embodiments, system 700 may include more than one instance of the devices shown, such as more than one processor 10, for example. In various embodiments, system 700 may be configured as a rack-mountable server system, a standalone system, or in any other suitable form factor. In some embodiments, system 700 may be configured as a client system rather than a server system.

In various embodiments, system memory 710 may comprise any suitable type of system memory as described above, such as FB-DIMM, DDR/DDR2 SDRAM, or RDRAM®, for example. System memory 710 may include multiple discrete banks of memory controlled by discrete memory interfaces in embodiments of processor 10 configured to provide multiple memory interfaces 130. Also, in some embodiments system memory 710 may include multiple different types of memory.

Peripheral storage device 720, in various embodiments, may include support for magnetic, optical, or solid-state storage media such as hard drives, optical disks, nonvolatile RAM devices, etc. In some embodiments, peripheral storage device 720 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 730 may include a device such as an FPGA or ASIC configured to coordinate initialization and boot of processor 10, such as from a power-on reset state. Additionally, in some embodiments boot device 730 may include a secondary computer system configured to allow access to administrative functions such as debug or test modes of processor 10.

Network 740 may include any suitable devices, media and/or protocol for interconnecting computer systems, such as wired or wireless Ethernet, for example. In various embodiments, network 740 may include local area networks (LANs), wide area networks (WANs), telecommunication networks, or other suitable types of networks. In some embodiments, computer system 750 may be similar to or identical in configuration to illustrated system 700, whereas in other embodiments, computer system 750 may be substantially differently configured. For example, computer system 750 may be a server system, a processor-based client system, a stateless "thin" client system, a mobile device, etc.

It is to be understood that the above embodiments are intended to be exemplary only. For example, the various features described herein may be combined in different ways than those explicitly discussed. Numerous alternative configurations are possible and are contemplated. Numerous variations and modifications will become apparent to those skilled in the art once the above disclosure is fully appreciated. It is intended that the following claims be interpreted to embrace all such variations and modifications.

What is claimed is:

1. A mechanism for managing timers in a multithreaded processing system, the mechanism comprising:
   a storage device configured to store a plurality of count values corresponding to a plurality of control programs;
   a reference count; and
   a read address generator coupled to convey a read address to the storage device, wherein the read address generator is configured to:
   increment a first count;
   convey a first read address as a current timer read address in response to determining said count does not equal a predetermined value; and
   convey a second read address as the current timer read address in response to determining said count equals the predetermined value.

2. The mechanism as recited in claim 1, wherein said plurality of count values correspond to a plurality of threads.

3. The mechanism as recited in claim 2, wherein the second read address comprises an incrementation of the first read address.

4. The mechanism as recited in claim 3, wherein the read address generator is further configured to convey a third read address in lieu of either said first read address or the second read address, in response to detecting a software initiated read access to one of the plurality of count values in said storage device.

5. The mechanism as recited in claim 4, wherein said storage device is further configured to receive a software initiated write access, wherein said write access may occur on a cycle immediately preceding or following a software read access to the storage device corresponding to the third read address.

6. The mechanism as recited in claim 4, wherein software is configured to initiate a maximum of N accesses to said plurality of count values during a given period of M cycles, and wherein the predetermined value is selected to be equal to N+1.

7. The mechanism as recited in claim 6, wherein in response to receiving a current timer read address, the storage device is configured to convey a timer count stored therein which corresponds to the current timer read address, and wherein the mechanism is configured to convey a timer expiration signal in response to determining the timer count equals the reference count.

8. The mechanism as recited in claim 7, wherein the mechanism includes a single comparator for comparing the reference count to values conveyed from the storage device.

9. A method for managing timers in a multithreaded processing system, the method comprising:
   storing a plurality of count values corresponding to a plurality of control programs;
   maintaining a reference count; and
   incrementing a first count;
   conveying a first read address as a current timer read address in response to determining said count does not equal a predetermined value; and
   conveying a second read address as the current timer read address in response to determining said count equals the predetermined value.

10. The method as recited in claim 9, wherein said plurality of count values correspond to a plurality of threads.

11. The method as recited in claim 10, further comprising incrementing the first read address to generate the second read address.

12. The method as recited in claim 11, further comprising conveying a third read address in lieu of either said first read address or the second read address, in response to detecting a software initiated read access to one of the plurality of count values.

13. The method as recited in claim 12, further comprising receiving a software initiated write access to the storage device, wherein the write access may occur on a cycle immediately preceding or following a software read access to the storage device corresponding to the third read address.

14. The method as recited in claim 12, wherein software is configured to initiate a maximum of N accesses to said plurality of count values during a given period of M cycles, and wherein the predetermined value is selected to be equal to N+1.

15. The method as recited in claim 14, further comprising conveying a first count value of said plurality of count values which corresponds to a received current timer read address, and conveying a timer expiration signal in response to determining the first count value equals the reference count.

16. The method as recited in claim 15, further comprising utilizing no more than one comparator for comparing the reference count to values of the plurality of count values.

17. A multithreaded, multicore microprocessor comprising:
   a crossbar; and
   a plurality of cores coupled to said crossbar;
   wherein a first core of said cores includes:
   a storage device configured to store a plurality of count values corresponding to a plurality of control programs;
   a reference count; and
   a read address generator coupled to convey a read address to the storage device, wherein the read address generator is configured to:
   increment a first count;
   convey a first read address as a current timer read address in response to determining said count does not equal a predetermined value; and
   convey a second read address as the current timer read address in response to determining said count equals the predetermined value.

18. The microprocessor as recited in claim 17, wherein said first core is configured to execute a plurality of threads, and wherein said plurality of count values correspond to the plurality of threads.

19. The microprocessor as recited in claim 18, wherein the read address generator is further configured to convey a third read address in lieu of either said first read address or the second read address, in response to detecting a software initiated read access to one of the plurality of count values in said storage device.

20. The microprocessor as recited in claim 19, wherein software is configured to initiate a maximum of N accesses to said plurality of count values during a given period of M cycles, and wherein the predetermined value is selected to be equal to N+1.

21. The microprocessor as recited in claim 20, wherein in response to receiving a current timer read address, the storage device is configured to convey a timer count stored therein which corresponds to the current timer read address, and wherein the mechanism is configured to convey a timer expiration signal in response to determining the timer count equals the reference count.

22. The microprocessor as recited in claim 21, wherein the mechanism includes a single comparator for comparing the reference count to values conveyed from the storage device.

23. The microprocessor as recited in claim 19, wherein the storage device is further configured to receive a software initiated write access, wherein said write access may occur on a cycle immediately preceding or following a software read access to the storage device corresponding to the third read address.

* * * * *